United States Patent [19]

Murray

[11] Patent Number: 4,524,184

[45] Date of Patent: Jun. 18, 1985

[54] IMPACT POLYMER COMPOSITION

[75] Inventor: James G. Murray, East Brunswick, N.J.

[73] Assignee: Mobil Oil Corporation, New York, N.Y.

[21] Appl. No.: 603,052

[22] Filed: Apr. 23, 1984

[51] Int. Cl.³ .................. C08L 51/04; C08L 53/02
[52] U.S. Cl. ........................ 525/314; 525/71; 525/98; 525/316
[58] Field of Search ............ 525/98, 71, 314, 316

[56] References Cited

U.S. PATENT DOCUMENTS

| | | | |
|---|---|---|---|
| 4,239,859 | 12/1980 | Miller | 525/98 |
| 4,275,179 | 6/1981 | Sherman | 525/98 |
| 4,352,908 | 10/1982 | Murray | 525/98 |
| 4,397,988 | 8/1983 | Sherman | 525/98 |
| 4,425,459 | 1/1984 | Fletcher . | |

FOREIGN PATENT DOCUMENTS 2248458 4/1973 Fed. Rep. of Germany ........ 525/98
2504118 8/1975 Fed. Rep. of Germany ........ 525/98

OTHER PUBLICATIONS

"New Morphologies in Rubber–Modified Polymers", by Gerard Riess et al., J. Macromol. Sci.–Phys. B17(2), 355–374, (1980).

*Primary Examiner*—Allan M. Lieberman
*Attorney, Agent, or Firm*—Alexander J. McKillop; Michael G. Gilman; Edward J. Trojnar

[57] ABSTRACT

A polymer composition of polyparamethylstyrene and styrene-butadiene block copolymer. The polyparamethylstyrene has a molecular weight of about 50k–400k. The styrene-butadiene block copolymer has a weight average molecular weight of about 50k–250k, and is present in the composition in the amount of about 5–20 percent by weight as concentrated rubbery domains within the polyparamethylstyrene. Compositions according to the present invention show good impact, melt flow and transparency properties.

9 Claims, 5 Drawing Figures

IMPACT POLYMER COMPOSITION

BACKGROUND OF THE INVENTION

1. Field of the Invention

The present invention is directed to polymer compositions. More particularly, it is directed to polymer compositions having good impact resistance and high transparency. Specifically, the the present invention is directed to a composition of polyparamethylstyrene and a styrene-butadiene block copolymer. This composition has been found to possess good impact resistance and high transparency.

2. Description of the Prior Art

Attempts to make highly transparent impact compositions have been made previously. For example, British Patent No. 1,230,507 by Wiley et al is directed to high impact monovinyl aromatic polymer compositions containing block copolymer. Essentially, a two component composition is disclosed. The first component forms 80 to 97 weight percent of the composition and is a monovinyl aromatic monomer containing up to 10 carbon atoms, present in the amount of at least 60 weight percent, and another monomer copolymerizable with the monovinyl aromatic monomer. The second component is a toughening agent, present in the amount of about 3 to 20 percent by weight. The toughening agent is formed from a block copolymer of a monovinyl aromatic monomer and 1,3-butadiene and optionally a rubbery butadiene polymer. There is no specific disclosure of the combination of polyparamethylstyrene and styrene-butadiene block copolymer.

Riess et al disclose blends of styrene polymer with mixtures of styrene-isoprene block copolymers in the *Journal of Macromolecular Science and Physics*, B17 (2) 355, 1980.

Although the composition specifically disclosed by Wiley et al show improved clarity over previous impact compositions, better clarity is desired.

SUMMARY OF THE INVENTION

It is an object of this invention to provide polymer compositions having good impact and transparency properties. It is a further object to provide polymer compositions with good melt flow and processing properties.

The above objects and others are obtained by providing a polymer composition which consists essentially of polyparamethylstyrene and a styrene-butadiene block copolymer. The polyparamethylstyrene has a weight average molecular weight of about 50k–400k, and the block copolymer has a weight average molecular weight of about 50k–250k. The block copolymer is present in the composition in an amount of about 5–20 percent by weight, and is distributed throughout the polyparamethylstyrene as concentrated rubbery domains. The composition can be formed by dissolving the block copolymer in paramethylstyrene monomer, and then polymerizing the paramethylstyrene.

DETAILED DESCRIPTION OF THE INVENTION

Figure 1:
FIGS. 1 through 5 are transmission electron micrographs of compositions from Examples 1, 3, 6, 9 and 11 respectively, discussed below.

The composition of the present invention consist essentially of polyparamethylstyrene and a styrene-butadiene block copolymer. Although the polyparamethylstyrene may be considered a homopolymer, it is contemplated that some small amounts of paramethylstyrene may be grafted onto the block copolymer during formation of the composition. Known processing agents for impact polymer compositions, for example, antioxidants such as Irganox 1076 (2,6-di-tert-butyl-4-methylphenol) and Polyguard (a phosphite stabilizer), chain transfer agents such as mercaptans, and lubricating agents such as mineral oil, are not excluded from the composition.

The polyparamethylstyrene has a weight average molecular weight of about 50k–400k, preferably 100k–300k. The styrene-butadiene block copolymer has a weight average molecular weight of about 50k–250k, preferably 80k–250k. The block copolymer is well known and readily available from commercial sources, for example from Phillips Petroleum under the registed trademark SolPrene.

The styrene-butadiene copolymer includes about 20–50 percent by weight styrene and about 80–50 percent by weight of the block copolymer butadiene. Most of the styrene should be in the form of block polystyrene. Thus, about 20–50 percent by weight of the block copolymer, preferably 30–40 percent by weight, is in the form of block polystyrene.

The compositions of the present invention may be prepared by dissolving the styrene-butadiene block copolymer in paramethylstyrene monomer, and optionally, a secondary solvent such as ethylbenzene. Processing aids as described previously also may be included in the solution. The solution is stirred for about 1 to 4 hours at a temperature of about 115°–140° C., to produce at least 20 percent solids in the solution. This is followed by a second stage of heating without stirring at about 145° C. for about 4 hours to carry the polymerization reaction to about 70 percent completion. This is followed by a third stage in which the temperature is increased to about 165° C. over a period of about 30 minutes and then heated at 165° C. for about 2 hours to carry the reaction further. The resulting composition is devolatilized at high temperature and low pressure, for example 190° C. and 0.1 mm, for a time period such as 30 minutes. As is known in the art, the molecular weight of the polyparamethylstyrene can be controlled through the variation of the second and third stage temperatures. That is, increasing the temperature in the second or third stages will result in shorter heating times and decreased molecular weights. The converse can be expected for a decreased temperature.

SYNTHESIS EXAMPLE

A solution was prepared containing 200 grams of paramethylstyrene, 20 grams of ethylbenzene, 30 grams of styrene-butadiene block rubber (molecular weight 225k with 35 percent block styrene), 0.25 grams of Irganox 1076, 0.25 grams of Polyguard HR, 0.007 grams of t-dodecylmercaptan and 3 grams of mineral oil. The mixture was stirred for 3 hours at 128° C. to obtain a solids content of 36.4 percent. This was followed by heating without stirring for 4 hours at 145° C. The temperature then was increased to 165° C. over a period of 30 minutes, followed by heating at 165° C. for 2 hours, after which 81.2 percent solids was present. This material was devolatized for 30 minutes at 190° C. and 0.1 mm pressure.

The composition from this process was pressed into translucent sheets 0.9 mm thick having the following physical properties: Notched Izod-0.35 ft-lbs/inch; Tensile Yield-3800 psi; Break-3400 psi; Elongation-3.6 percent. Transmission electron micrographs showed the morphology to be mixed lamellar structures, with a preponderance of spiral ("onion skin") structures.

The following Table I describes tests demonstrating the advantages of the present invention over similar compositions, such as easier phase separation of the rubber phase with improved flow properties and formation of distinctive morphologies, and increased clarity of the product. The products tested were compression molded sheets having a thickness of 0.9 mm.

TABLE I

POLYMERIZATION OF STYRENE AND PARAMETHYLSTYRENE IN PRESENCE OF BLOCK POLYMER RUBBER

| Example[1] | Components | | Reaction Conditions | | |
|---|---|---|---|---|---|
| | Monomer/ Parts | Block Polymer Rubber Type[2] (Parts) | Initial Temp. °C. | Time Hrs. | Final % Conv. |
| 1 | PMS/200 | Sty-Bd/30 Composition A | 128° | 2.5 | 85 |
| 2 | PMS/200 | Sty-Bd/30 Composition A | 128°[3] | 3 | 81 |
| 3 | Sty/200 | Sty-Bd/30 Composition A | 128°[4] | 2.5 | 89 |
| 4 | Sty/200 | Sty-Bd/30 Composition A | 118° | 1.5 | 87 |
| 5 | Sty/200 | Sty/Bd/30 Composition A | 128° | 3 | 84 |
| 6 | Sty/200 | Sty/Bd/24 Composition A | 140° | 1.5 | 86 |
| 7 | PMS/200 | PMS-Bd/30 Composition B | 128° | 2.5 | 84 |
| 8 | PMS/200 | PMS-Bd/30 Composition B | 128° | 3.5 | 84 |
| 9 | PMS/200 | PMS-Bd/24 Composition C | 128° | 3 | 84 |
| 10 | PMS/200 | Sty-Bd/30 Composition D | 128° | 3 | 82 |
| 11 | PMS/200 | Sty-Bd/30 Composition D | 140° | 2 | 83 |
| 12 | PMS/200 | Sty-Bd/30 Composition D | 140° | 2 | 83 |
| 13 | Sty/200 | PMS-Bd/30 Composition B | 128° | 3 | 83 |

| Example[1] | Product | | | | |
|---|---|---|---|---|---|
| | Melt Flow Index | Notched Izod Impact | Tensile Yield psi | Break psi | Elong. % | Clarity |
| 1 | 2.6 | 0.3 | — | 4,000 | 3.5 | High |
| 2 | 4.8 | 0.35 | 3,800 | 3,400 | 3.6 | High |
| 3 | No Flow | — | — | — | — | — |
| 4 | No Flow | — | — | — | — | — |
| 5 | No Flow | — | — | — | — | — |
| 6 | 1.4 | 0.58 | 3,500 | 2,800 | 8.4 | Good |
| 7 | 0.26 | 0.15 | 4,600 | 4,300 | 7.6 | — |
| 8 | No Flow | — | — | — | — | — |
| 9 | 3.2 | 0.31 | 4,400 | 4,300 | 4.8 | Good |
| 10 | 3.8 | 0.65 | — | 2,900 | 2.6 | High |
| 11 | 9.7 | 0.36 | — | 1,900 | 0.9 | High |
| 12 | 5.5 | 0.35 | 3,500 | 3,200 | 2.0 | High |
| 13 | 0.3 | — | — | — | — | Low |

Figure 2:

[1]All polymerizations carried out in a 2″ stirred reactor (400 RPM unless noted otherwise) at the temperature and time shown in table followed by a finishing reaction of 2 hours heating at 145° followed by 2 hours at 165° C., devolatilization was then carried out at 200° C. for 30 minutes under vaccum.
[2]Block rubber compositions: Composition A = Styrene-butadiene, MWT = 225,000, block styrene content = 35%, intrinsic viscosity = 1.62; Composition B = PMS - butadiene, intrinsic viscosity = 1.20, MWT - about 100,000, block PMS content - 40%; Composition C = PMS - butadiene, intrinsic viscosity = 2.44, MWT - about 225,000, block styrene content = 40%; Composition D = styrene-butadiene, MWT = 160,000, block styrene content = 22%.
[3]Stirring speed at 180 RPM
[4]Polymerization mixture contained 0.2 parts p-t-butylperbenzoate Under conditions in which paramethylstyrene containing dissolved styrene-butadiene block copolymer polymerized to give an impact polymer with good flow properties and good phase separation (forming a predominantly "onion skin" morphology as can be seen in Examples 1 and 2 and FIG. 1), styrene containing the same styrene-butadiene block polymer and polymerized under the same conditions gave a product in which the rubbery phase did not separate into a discrete phase, and the resulting network structure led to a product having no melt flow. These polymers would not be useful as thermoplastic resins (Examples 3, 4 and 5 and FIG. 2). It was possible to get a phase separated product by polymerization of styrene containing styrene-butadiene block polymer by reducing the block rubber content and increasing the polymerization temperature, thus forming a product having a predominantly small capsular structure, as can be seen from Example 6 and FIG. 3.

It also was difficult to get good phase separation by using a paramethylstyrene-butadiene block copolymer rubber as an impact modifier in a paramethylstyrene polymerization (Examples 7 and 8). By using a very high molecular weight block copolymer rubber, it was possible to get phase separation under these conditions with predominant formation of a small, capsular structure (Example 9 and FIG. 4).

Figure 5:
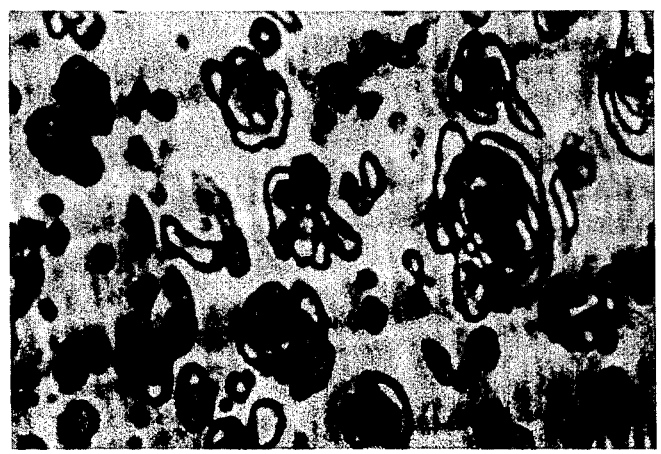

When a lower molecular weight styrene-butadiene block copolymer having a lower block styrene content was used as the impact modifier in a paramethylstyrene polymer, good phase separation resulted, with formation of an impact polymer having good clarity and flow properties and a "ball of yarn" morphology, as can be seen in Examples 10-12 and FIG. 5. In spite of the relatively large particle sizes of the concentrated rubbery domains within the polyparamethylstyrene of the present invention, the products of the present invention (Examples 1, 2, 10, 11 and 12) all showed high clarity.

Figure 3:
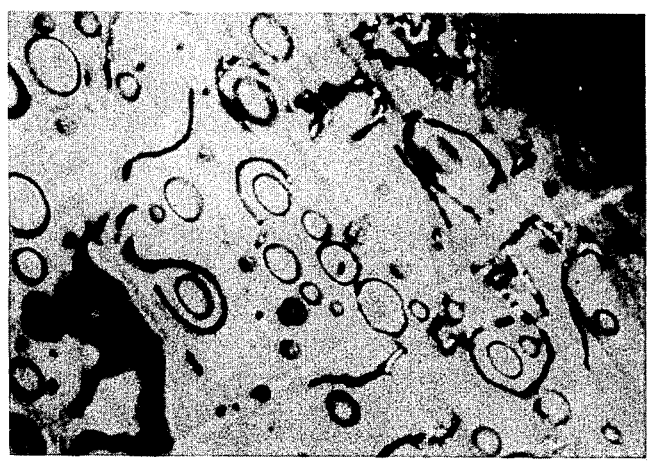
Figure 4:
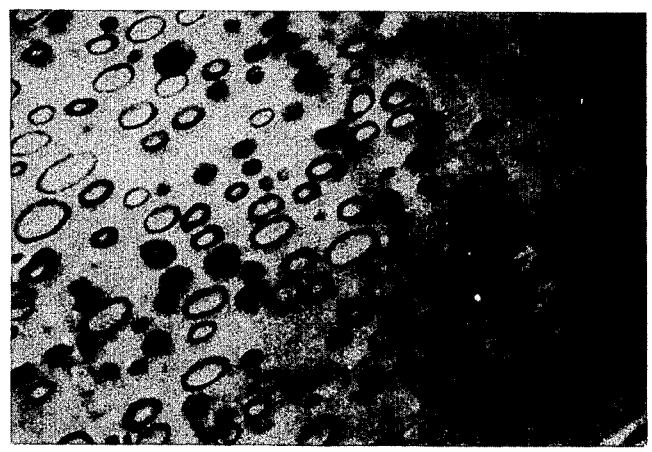

The capsular rubber domains of FIGS. 3 and 4 have a particle size of about 0.5 micron. The particle sizes for the rubber domains of the products shown in FIGS. 1 and 5 (Examples 2 and 11) generally are larger, about 1.0–2.5 microns, preferably at least 1.5 microns, and can be as large as 4–5 microns.

When a paramethylstyrene-butadiene block copolymer rubber was used as an impact modifier in a styrene polymer, an impact polymer having flow properties was obtained. However, as can be seen by Example 13, the clarity was lower than the converse situation using the paramethylstyrene monomer and a styrene-butadiene block copolymer.

The compositions of the present invention thus show good impact properties and high clarity. The compositions are useful for the same purposes as presently known impact compositions, for example molded or extruded articles such as cups, or films or sheets for forming laminates.

Although a detailed description and specific examples of the present invention have been provided above, these are not to be construed as limiting the present invention, which is defined in the following claims.

I claim:

1. A high clarity impact polymer composition having an Izod Impact Strength of greater than 0.3 ft-lb/in, consisting essentially of polyparamethystyrene having a weight average molecular weight of about 50k–400k and styrene-butadiene block copolymer having a weight average molecular weight of about 50k–250k prepared by dissolving the block copolymer in paramethylstyrene monomer and polymerizing the paramethylstyrene, said block copolymer being present in the amount of about 5–20 percent by weight as concentrated rubbery domains within the polyparamethylstyrene.

2. The impact copolymer composition of claim 1 in which said block copolymer has a butadiene content of greater than 60 weight percent.

3. The composition of claim 1, wherein the styrene-butadiene copolymer consists essentially of about 20–50 percent by weight styrene and about 80–50 percent by weight butadiene.

4. The composition of claim 3, wherein 20–50 percent by weight of said copolymer is in the form of block polystyrene.

5. The composition of claim 4, wherein 30–40 percent of said copolymer is in the form of block polystyrene.

6. The composition of claim 1, wherein the polyparamethylstyrene has a weight average molecular weight of about 100k–300k.

7. The composition of claim 1, wherein the styrene-butadiene block copolymer has a molecular weight of about 80k–250k.

8. The composition of claim 1, wherein the concentrated rubbery domains of said copolymer have a particle size of at least 1.0 micron.

9. The composition of claim 8, wherein the particle size is at least 1.5 microns.

* * * * *